UNITED STATES PATENT OFFICE.

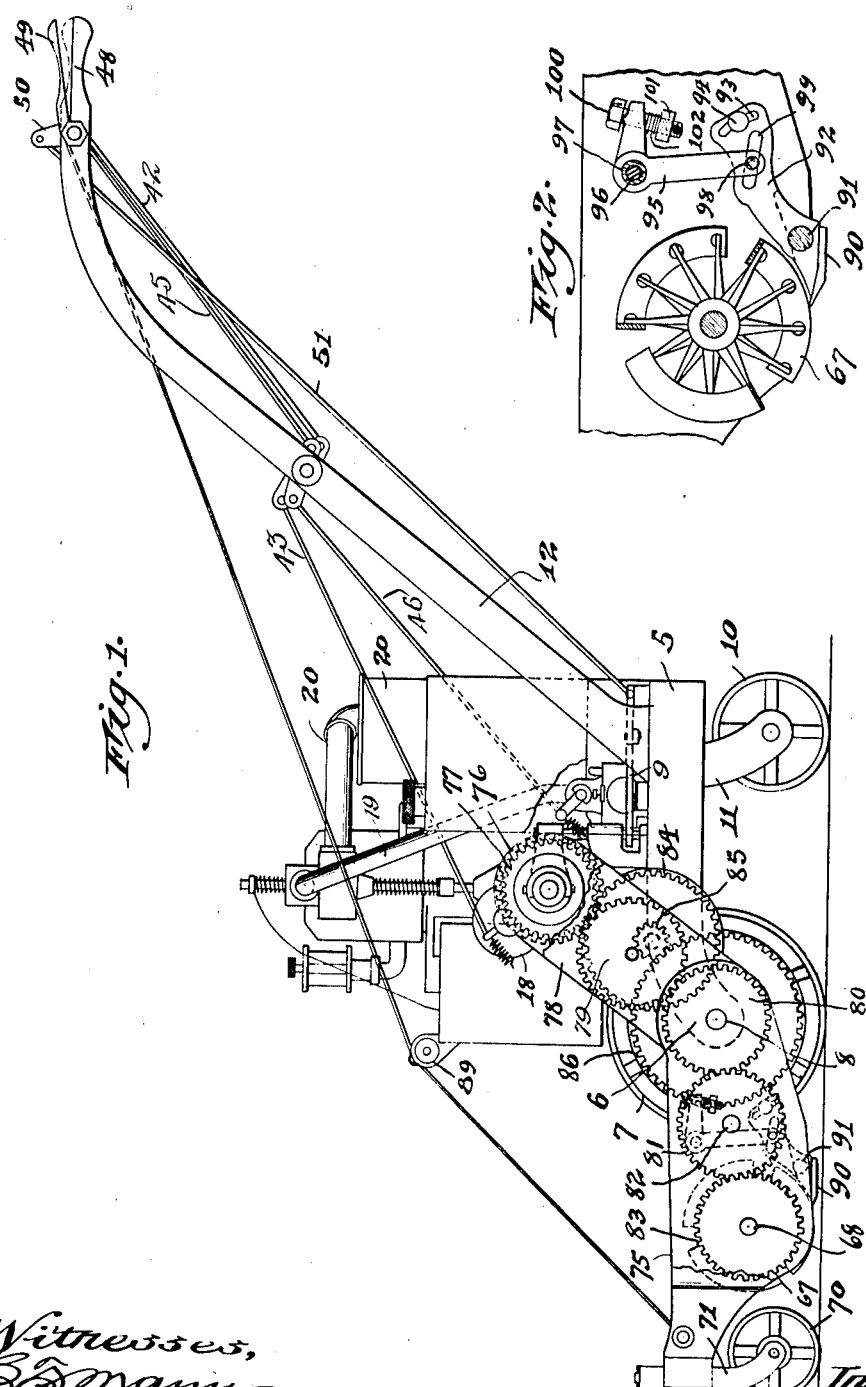

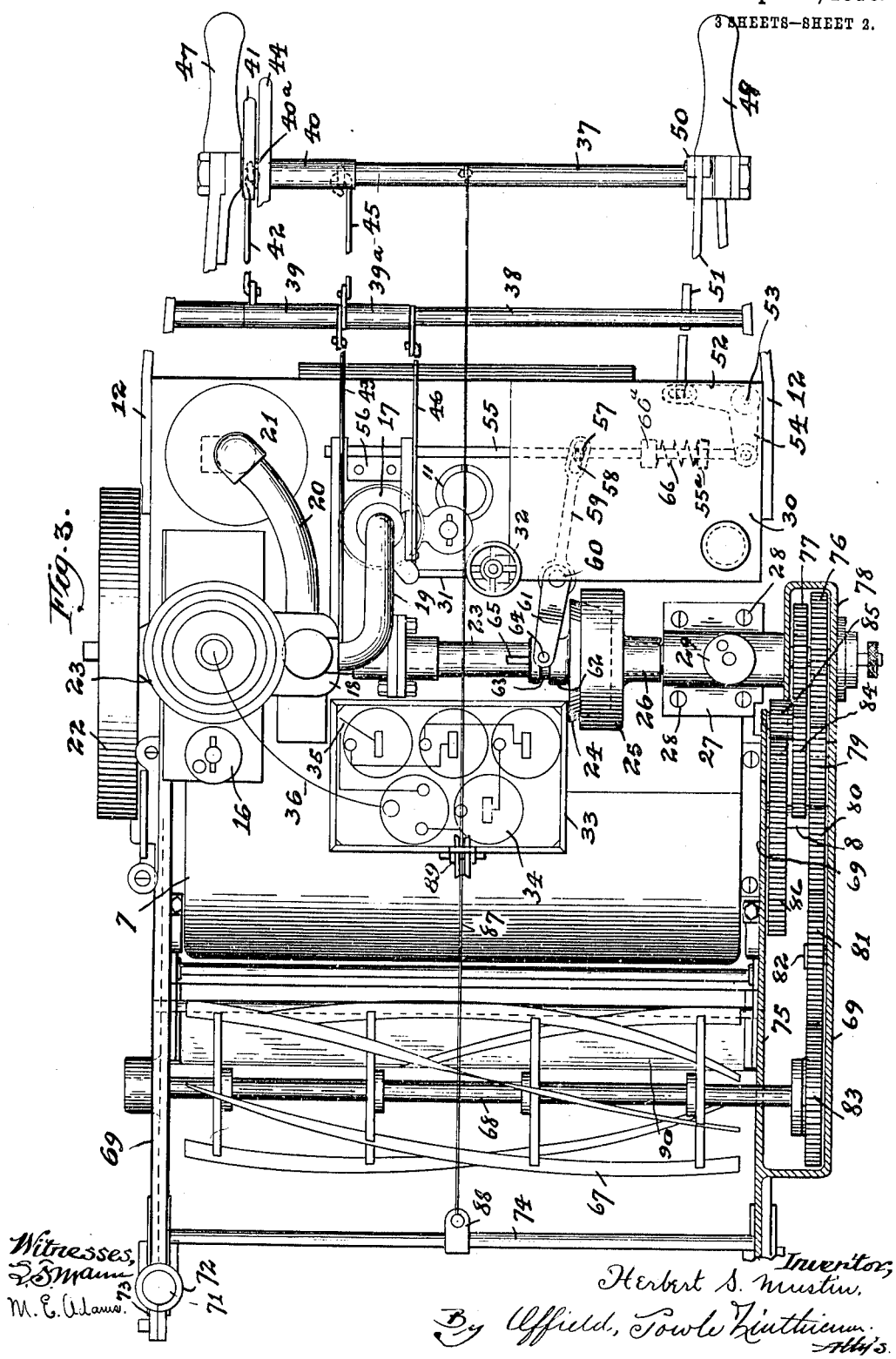

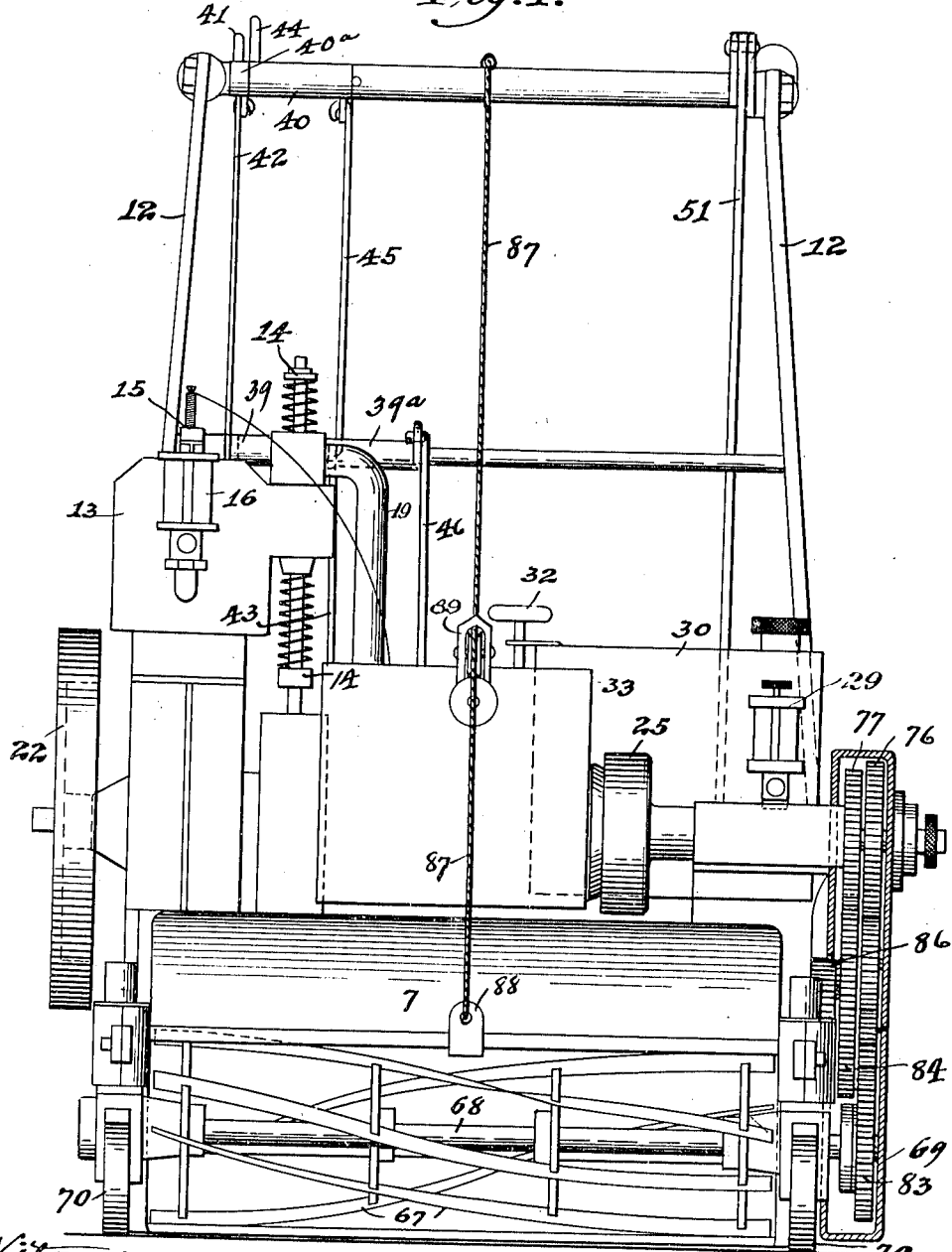

HERBERT S. MUSTIN, OF CHICAGO, ILLINOIS, ASSIGNOR TO AUSTIN MANUFACTURING COMPANY, OF CHICAGO, ILLINOIS, A CORPORATION OF ILLINOIS.

MOTOR LAWN-MOWER.

969,797.          Specification of Letters Patent.     Patented Sept. 13, 1910.

Application filed December 22, 1908. Serial No. 468,810.

*To all whom it may concern:*

Be it known that I, HERBERT S. MUSTIN, a citizen of the United States, residing at Chicago, in the county of Cook and State of Illinois, have invented certain new and useful Improvements in Motor Lawn-Mowers, of which the following is a specification.

The invention relates in general to a motor lawn mower but pertains more in particular to a lawn mower of a type wherein the device, as a whole, is propelled by motive power and steered and governed by an operator not carried by the device.

The principal object of the invention is to provide a simple device of this character which is easily operated and controlled.

Another object of the invention is to provide controlling means whereby when the operator grasps the handles of the machine it will automatically throw in the clutch for the driving thereof, and when the operator releases his grasp upon the handles the clutch will become disengaged and the supply of gaseous mixture to the engine will be reduced.

Another feature of the invention resides in the arrangement of the gears, whereby the cutter mechanism can be easily lifted from the ground into an inoperative position and maintained there.

Still another advantage resides in the means for adjusting the cutter knife relative to the cutter blades.

Other advantages will appear throughout the specification and claims, and are shown in the drawings in which—

Figure 1 is a side elevational view of my device with parts broken away. Fig. 2 is an enlarged detailed view of the cutter knife, blades and adjusting means therefor. Fig. 3 is an enlarged top plan view of Fig. 1. Fig. 4 is an end elevational view of Fig. 3.

Throughout the specification when the word "end" is used, it will refer to the forward end of the machine where the cutting mechanism is located, and the word "rear" refers to the end at which the handles are secured.

Referring now more particularly to the drawings, 5 represents as a whole the main frame consisting of a pair of side plates, the forward ends 6 of which are slightly bent downward, and between said ends the roller 7 is mounted on a suitable axle 8 that is journaled in the sides of the main frame. The rear ends of the side plates are joined together by means of a suitable end member 9 which end is supported by a caster wheel 10, journaled in a supporting fork 11 that is pivotally secured to the frame 5. A pair of arms 12 are adapted to be secured to the frame and project rearwardly, for the manual control and guiding thereof.

Carried upon the frame and suitably secured thereto, is an explosive engine designated as a whole at 13, being provided with the usual in-take and exhaust valves 14, a spark plug 15, oil cup 16, carbureter 17, timer mechanism, designated as a whole at 18, in-take pipe 19 leading from the carbureter to the in-take side of the engine, exhaust pipe 20 leading from the engine to a muffler 21, fly-wheel 22, preferably mounted at one side of the frame upon the main driving shaft 23, which carries the male member 24 of a friction cone clutch, the female member 25 of which is shown in Figs. 3 and 4. The female member 25 is secured to a driving shaft 26, which is suitably secured to and rotates in the bearing plate 27, attached to the frame by means of the screws 28, and provided with an oil cup 29. A gasolene tank 30 is also mounted upon the frame that has a supply pipe 31 leading to the carbureter, and a suitable valve 32 is adapted to control the gasolene from the supply tank to the carbureter. 33 is a suitable box for holding the dry cells 34 or other means for supplying the electric current; the wires 35 leading to the commutator or timing mechanism 18, one of said wires acting as a ground wire, and the wire 36 leading from one of said batteries to the spark plug. It is to be understood, however, that the parts described pertaining to the gasolene engine constitute no part of this invention, as said parts are well-known in the art.

Suitable tie-rods 37 and 38 extend between the handles 12, and are secured thereto in any suitable manner. Mounted upon said tie-rods 37 and 38 are the sleeves 39, 39ᵃ, 40 and 40ᵃ, respectively, which have a limited rotating movement relative to said tie-rods; the sleeve 40ᵃ carrying a finger member 41 which is non-rotatably secured to the sleeve 40ᵃ and connected to the sleeve 39 by means of a connecting member 42, so that when the finger member 41 is moved, it will also cause the sleeve 39 to be rotated on the connecting rod 38. The sleeve 39 is in turn connected to the commutator 18 by means of a connecting member 43 so that a movement of the finger member 41 results in a movement of the commutator 18. Sleeve 40 also carries a finger member 44, said sleeve 40 being connected to the sleeve 39ª by means of a connecting member 45; the sleeve 39ª being in turn connected to a suitable movable part in the carbureter 17 by means of the connecting member 46. It may, at this point, be stated that the specific means for regulating the commutator and the carbureter to which the rods 43 and 46, respectively, are connected, is the subject-matter of a separate application and need not further be herein shown.

Each arm 12 is provided with a suitable gripping member or handle 47 and 48, handle 48 having a controlling member 49 near it, which controlling member is pivoted to the arm 12 and a lever 50 is rigidly secured to said controlling member 49. Pivotally secured to the lever 50 is a connecting rod member 51 extending to and connected with one end of a bell crank 52 that is pivotally secured to the frame at 53; the other end of the bell crank 54 being connected to a laterally movable rod 55 slidably mounted in a suitable support 56. The sliding bar 55 is provided with a pin 57 adapted to slidably engage an elongated slot 58 formed at one end of a link connection 59 that is rigidly connected at its other end, by means of a suitable joint 60, to a pair of jaws 61, the ends of which are adapted to straddle the hub 62 formed on the male member 24 of the clutch. A circumferential groove 63 is formed on the hub 62 into which pins 64, at the end of the jaws, are adapted to extend, so as to permit the male member to freely rotate with respect to said jaws 61. The main driving shaft 23 is connected to the hub 62 by means of a sliding key-way 65 so as to permit the male member to have a longitudinal sliding movement relative to the main driving shaft 23.

In Fig. 3 the male member of the clutch is shown as disengaged from the female member, so that the parts are not connected for driving the device. When it is desired to drive the machine after the engine has been started, the operator grasps the handle 48 moving the split portion 49 toward the handle portion 48 which in turn moves the lever 50 and through the medium of the connecting member 51 the bell crank 52 is turned upon the pivot 53 moving the sliding rod 55 to the left, as shown in Fig. 3, which through the medium of the link 59 and jaws 61, throws the clutch into engagement and the machine proceeds to move just so long as the operator is squeezing the two portions 48 and 49 of the handle 48 together, but as soon as the grip is released the clutch is automatically thrown out of engagement.

It is obvious that a spring 66 might be employed to assist the throwing out of the clutch, such as by interposing the spring 66 between the lug 55ª formed on the rod 55 and the lug 66ª secured at a suitable point and not movable relative to the rod 55 so that the normal tension of the springs is to force the male and female members apart.

The finger members 41 and 44 are located near the handle 47 so that the operator can move either one of said members by means of the thumb without loosening his grasp from the handle 47, and if it is desired to advance or retard the timing mechanism the finger member 41 can be moved up or down, or if it is desired to increase or diminish the gaseous mixture to the engine the finger member 44 can be moved so as to operate the throttle of the carbureter.

Referring now to the cutting mechanism, the rotary knives 67 are of the well-known type and secured to a shaft 68 which is journaled in the opposite sides of a supplemental frame, designated as a whole by 69, and adapted to carry the entire cutting mechanism. The frame 69 consists of side plates, the inner ends of which are pivotally mounted on the axle 8 of the roller 7, while the outer ends carry the caster wheels 70 that are rotatably secured to the forks 71 which are pivotally mounted in the bearings 72 formed at the outer ends of each side plate of the frame 69. Suitable clamping means 73 comprising a split clamp adapted to be drawn together by a threaded bolt, or other suitable means are provided for spreading the bearing means 72 whereby the forks 71 may be adjusted in the bearing to raise or lower the cutting mechanism. A tie rod 74 connects the outer ends of said side plates. At one side of the machine the side plate is preferably made double, as shown by the inner side plate 75 which acts as a guard to prevent the grass from being thrown into the gears; the inner side plate 75 also being pivotally mounted upon the axle 8. Mounted upon the main driving shaft 23 are a pair of gears 76 and 77, that are inclosed within a casing 78 which is mounted upon the main frame in any suitable manner and serves to protect the various gears. The gear 76 drives through intermediate gear 79, which is journaled in the side frame, the gear 80 loosely mounted on the axle 8, the gear 81 secured to the side frame 69 by means of the stud shaft 82, driving the cutter shaft 68 through the gear 83 which is secured at one end to the cutter shaft 68. The gear 77 is the main driving gear for the roller 7, driving through the gear 84, the pinion wheel 85, which in turn is meshed with the large gear 86 mounted at one end of the shaft 8 of the roller 7, and through which gear the movement of the entire device is effected.

It can thus be readily seen from the description that the entire cutting mechanism is mounted upon the supplemental frame 69, the side plates of which are pivotally connected to the axle 8, and as a means for moving the supplemental cutter frame upon its pivot pins, a lifting member 87, such as a wire cord or the like, is attached to the tie rod 74 by means of the clip 88, extending over the upper portion of the machine to the tie rod 37, having a support 89 which is preferably a roller that may be secured to any suitable portion of the machine so that when it is desired to lift the cutting mechanism from the ground for moving the device from place to place, the operator may pull upon the lifting member 87 and when the cutting mechanism is at the desired elevation, the lifting member or cord is secured to the rod 37 and held in an inoperative position.

Coöperating with the blades 67 is the base blade 90 that is pivotally mounted upon a pivot rod 91 pivotally secured to the two sides of the supplemental frame. The base blade is secured to an adjusting plate 92 having a slot 93 at one end thereof, in which slot a set screw 94 extends and has a threaded engagement with one of the side plates of the supplemental frame. A lever 95 is pivotally mounted upon a sleeve 96 through which a stay rod 97 extends; the stay rod being secured to the side plates. One end of the lever is provided with a pin 98 that extends into a slot 99 in the adjusting plate 92, the other end of the lever being suitably apertured, and through which aperture a bolt 100 extends, having a threaded engagement with a lug 101, preferably formed integral with the side plate. For preventing any lost motion between the lever and the bolt 100 a spring 102 may be provided which is interposed between the lever and the lug 101.

In the preferred form of construction, a device such as shown in Fig. 2 for adjusting the base blade, is preferably provided at both sides of the machine, but it is perfectly obvious that this adjusting device upon one side would accomplish the desired purpose, which is to afford a uniform adjustment of the base blade relative to the cutter blade for its entire length. It can be readily seen that the proper adjustment of the base blade to the cutter blades can be accomplished by loosening or tightening the adjusting bolt 100, whereby the lever is moved so as to either move the base blade toward the cutter blades or away from the same, and that the movement of a single bolt 100 will effect the adjustment of the base blade for its entire length. After the blade has been placed in its adjusted position the set screw 94 is then tightened for holding the blades properly apart.

While the invention is described somewhat generally, the broad, general object intended to be accomplished, and the gist of the invention resides in the simplification of the parts and the control and operation of a machine of this character; and, therefore, without confining myself to the specific details of construction herein shown, I claim:

1. In a self-propelled hand lawn mower, the combination of a main frame carrying propelling mechanism, and a supplemental frame pivoted to the main frame and carrying the cutting mechanism, clutch mechanism between the propelling and cutting mechanism, handles connected to said main frame for guiding said lawn mower, means directly connected to one of said handles for engaging and disengaging the clutch mechanism, and means adjacent to the other of said handles for controlling the motor, substantially as described.

2. In a motor lawn mower, the combination of a main frame, a motor secured thereto, handles secured to said frame, means closely beside said handles for effecting the engagement of the clutch, and for controlling the motor, a main roller secured to said main frame and supporting the forward end, clutch mechanism between said motor and main roller, a supplemental frame pivotally secured to said main frame and carrying cutting mechanism, connections between said motor, roller and cutting mechanism for propelling the mower and for rotating the cutter, means on said supplemental frame for supporting said frame above the ground, and means for supporting the rear end of said main frame, substantially as described.

3. In a motor lawn mower, the combination of a main frame having a roller mounted at one end thereof, a motor carried by said main frame, gear connections between said motor and said roller, a clutch mechanism for coupling or uncoupling the connection between said motor and gears, a handle for guiding the mower, means on said handle for throwing the clutch into operative position, a supplemental frame pivotally secured to said main frame and carrying cutting mechanism, connections between said motor and cutting mechanism for operating the same, an adjustable support for said supplemental frame, a support for said main frame at the opposite end from said roller, and means for lifting said supplemental frame and cutting mechanism into an inoperative position, substantially as described.

4. In a motor lawn mower, the combination of a main frame, a lawn mower roller secured to said main frame at one end thereof, a ground engaging device secured to said main frame at the opposite end from said roller; a motor carried by said main frame, means for connecting said motor to said roller for propelling said main frame, a clutch mechanism between said motor and roller, handles connected to said main frame for steering said lawn mower, means carried by one of said handles for effecting the engagement or disengagement of the clutch, means adjacent the other handle for controlling the motor, a supplemental frame pivotally secured to said main frame and adapted to carry the cutting mechanism, a ground engaging device secured to said supplemental frame and adapted to support the cutting mechanism above the ground, a rotary cutter in said cutting mechanism, means between said motor and rotary cutter for effecting the driving of the latter, and means carried by said handle for raising the cutter mechanism and ground engaging device into an inoperative position, substantially as described.

5. In a motor lawn mower, the combination of a main frame, a roller secured thereto at one end, a ground engaging device at the opposite end of said frame from said roller, a supplemental frame pivotally secured to said main frame, cutting mechanism carried by said supplemental frame, gear connections between said motor roller and cutting mechanism, a clutch mechanism for effecting the transmission of power from said motor to said roller, and said cutting mechanism, handles connected to said main frame for the steering of said lawn mower, means carried by one of said handles for effecting the engagement or disengagement of the clutch, and means adjacent to the other of said handles for the control of the motor, substantially as described.

6. In a cutting mechanism, the combination of a rotary cutter, a base blade, and means for adjusting the position of said base blade relative to said rotary cutter, comprising a lever connected to said base blade by means of a pin and slot connection, means for moving said lever to effect the adjustment of the base blade, and means for holding said base blade in a set position, substantially as described.

7. In an adjusting device for a cutting mechanism, the combination of a frame, a rotary cutter secured to said frame at opposite sides thereof, a base blade pivotally secured to the opposite sides of said frame, a lever pivotally secured to one side of said frame and having a slot and pin connection with said base blade, a threaded bolt adapted to extend through one end of said lever and having a threaded connection with a stud secured to one side of said frame, whereby the movement of said bolt will move said lever to effect the adjustment of the base blade, and means for holding said base blade in an adjusted position, substantially as described.

HERBERT S. MUSTIN.

Witnesses:
JAMES R. OFFIELD,
M. E. ADAMS.